United States Patent
Barmatov et al.

(10) Patent No.: US 10,860,753 B2
(45) Date of Patent: Dec. 8, 2020

(54) CHARACTERIZATION OF FLUIDS WITH DRAG REDUCING ADDITIVES IN A COUETTE DEVICE

(71) Applicant: SCHLUMBERGER TECHNOLOGY CORPORATION, Sugar Land, TX (US)

(72) Inventors: Evgeny Borisovich Barmatov, Cambridge (GB); Dmitry Eskin, Melrose, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 766 days.

(21) Appl. No.: 15/035,072

(22) PCT Filed: Nov. 7, 2013

(86) PCT No.: PCT/US2013/068940
§ 371 (c)(1),
(2) Date: May 6, 2016

(87) PCT Pub. No.: WO2015/069260
PCT Pub. Date: May 14, 2015

(65) Prior Publication Data
US 2016/0275221 A1 Sep. 22, 2016

(51) Int. Cl.
*G06F 17/50* (2006.01)
*G01N 11/04* (2006.01)
(Continued)

(52) U.S. Cl.
CPC ............... *G06F 30/20* (2020.01); *G01F 1/28* (2013.01); *G01N 11/04* (2013.01); *G06F 17/11* (2013.01);
(Continued)

(58) Field of Classification Search
CPC ........ G06F 17/5009; G01N 11/04; G01F 1/28
(Continued)

(56) References Cited

U.S. PATENT DOCUMENTS

| 3,692,676 A | * | 9/1972 | Culter | C08F 6/12 137/13 |
| 3,938,536 A | * | 2/1976 | Metzner | F17D 1/16 137/13 |

(Continued)

OTHER PUBLICATIONS

V.N. Kalashnikov (Dynamical similarity and dimensionless relations for turbulent drag reduction by polymer additives, Elsevier Science B.V., 1998, pp. 209-230) (Year: 1998).*

(Continued)

*Primary Examiner* — Iftekhar A Khan (57) ABSTRACT

A method is provided for characterizing fluid flow in a pipe where the fluid includes a drag reducing polymer of a particular type and particular concentration. A computational model is configured to model flow of a fluid in a pipe. The computational model utilizes an empirical parameter for a drag reducing polymer of the particular type and the particular concentration. The computational model can be used to derive information that characterizes the flow of the fluid in the pipe. The empirical parameter for the particular type and the particular concentration of the drag reducing polymer can be identified by solving another computational model that is configured to model turbulent Couette flow in a Couette device for a fluid that includes a drag reducing polymer of the particular type and the particular concentration. The empirical data needed for identification of the empirical parameter are obtained from Couette device experiments.

20 Claims, 2 Drawing Sheets (51) Int. Cl.
*G01F 1/28* (2006.01)
*G06F 17/11* (2006.01)
*G01N 11/00* (2006.01)
*G06F 30/20* (2020.01)
*G06F 113/14* (2020.01)

(52) U.S. Cl.
CPC .... *G01N 2011/006* (2013.01); *G06F 2113/14* (2020.01)

(58) Field of Classification Search
USPC .......................................................... 703/2
See application file for complete search history.

(56) References Cited

U.S. PATENT DOCUMENTS

| | | | | |
|---|---|---|---|---|
| 4,077,251 | A * | 3/1978 | Winter .................... | G01N 11/14 73/54.35 |
| 4,734,103 | A * | 3/1988 | Fong ...................... | C08F 220/56 162/30.1 |
| 4,896,098 | A * | 1/1990 | Haritonidis ............ | G01N 13/00 324/663 |
| 5,538,191 | A * | 7/1996 | Holl ....................... | B01F 3/1221 241/1 |
| 6,471,392 | B1 * | 10/2002 | Holl .......................... | B01F 7/12 366/279 |
| 6,782,735 | B2 * | 8/2004 | Walters ................... | G01N 11/14 73/54.28 |
| 6,874,353 | B2 * | 4/2005 | Johnson .................. | G01N 11/14 73/54.28 |
| 6,959,588 | B2 * | 11/2005 | Zougari .................. | G01N 15/04 374/7 |
| 7,288,506 | B2 * | 10/2007 | Jovancicevic .......... | C10L 1/143 44/358 |
| 7,581,436 | B2 * | 9/2009 | Eskin ...................... | G01N 11/14 73/54.31 |
| 8,004,414 | B2 * | 8/2011 | Angell ..................... | G01F 1/708 340/10.1 |
| 8,020,617 | B2 * | 9/2011 | Shenoy .................... | C09K 8/68 166/278 |
| 8,039,055 | B2 * | 10/2011 | Moore ...................... | B63B 1/38 114/67 A |
| 8,276,463 | B2 * | 10/2012 | Sheverev .............. | G01B 11/165 73/760 |
| 8,794,051 | B2 * | 8/2014 | Morgan .................. | G01N 11/14 73/54.28 |
| 10,228,296 | B2 * | 3/2019 | Yang ........................ | G01L 1/00 |
| 10,413,901 | B2 * | 9/2019 | Slepian .............. | G01N 15/1056 |
| 2003/0056575 | A1 * | 3/2003 | Hettwer ................. | G01N 11/14 73/54.28 |
| 2003/0192693 | A1 * | 10/2003 | Wellington ......... | E21B 41/0064 166/267 |
| 2004/0255649 | A1 * | 12/2004 | Zougari .............. | G01N 33/2823 73/61.62 |
| 2008/0047328 | A1 * | 2/2008 | Wang ...................... | G01N 11/14 73/54.39 |
| 2008/0289435 | A1 * | 11/2008 | Slater ...................... | G01N 11/08 73/861.71 |
| 2009/0053811 | A1 * | 2/2009 | Black ...................... | C12M 27/10 435/384 |
| 2009/0294122 | A1 * | 12/2009 | Hansen ................... | E21B 43/25 166/250.01 |
| 2010/0004890 | A1 * | 1/2010 | Tonmukayakul ...... | G01N 11/14 702/113 |
| 2010/0326200 | A1 * | 12/2010 | Sheverev ............. | G01B 11/165 73/800 |
| 2011/0274875 | A1 * | 11/2011 | Lang ........................ | B64C 21/10 428/119 |
| 2013/0036829 | A1 * | 2/2013 | Van Steenberge ... | G01B 11/165 73/800 |
| 2013/0041587 | A1 * | 2/2013 | Gomaa ................... | E21B 43/26 702/6 |
| 2014/0137638 | A1 * | 5/2014 | Liberzon ................ | G01N 11/14 73/54.28 |
| 2015/0017385 | A1 * | 1/2015 | Lang ........................ | B32B 7/00 428/141 |
| 2015/0027702 | A1 * | 1/2015 | Godoy-Vargas ....... | C09K 8/512 166/279 |
| 2015/0226657 | A1 * | 8/2015 | Foster .................... | G01N 15/10 435/287.1 |
| 2016/0339434 | A1 * | 11/2016 | Toner ................ | B01L 3/502715 |

OTHER PUBLICATIONS

Yang et al. hereafter Yang ("Turbulent drag reduction with polymer additive in rough pipes", J. Fluid Mech. (2010), vol. 642, pp. 279-294) (Year: 2010).*

Michael D. Graham ("Drag Reduction in Turbulent Flow of Polymer Solutions", Rheology Reviews 2004, pp. 143-170) (Year: 2004).*

Greidanus et al. ("Drag reduction by surface treatment in turbulent Taylor-Couette flow",13th European Turbulence Conference, 2011, pp. 1-9) (Year: 2011).*

Japper-Jaafar et al. ("Turbulent pipe flow of a drag-reducing rigid "rod-like" polymer solution", J. Non-Newtonian Fluid Mech. 161 (2009) 86-93) (Year: 2009).*

Ptasinski et al, ("Experiments in Turbulent Pipe Flow with Polymer Additives at Maximum Drag Reduction", 2001 Kluwer Academic Publishers, pp. 159-182) (Year: 2001).*

Drappier et al. ("Turbulent drag reduction by surfactants", Europhys. Lett., 74 (2), pp. 362-368 (2006)) (Year: 2006).*

Dmitry Eskin ("An engineering model of a developed turbulent flow in a Couette device", Chemical Engineering and Processing 49 (2010) 219-224) (Year: 2010).*

Kalashnikov, V. N., "Dynamical Similarity and Dimensionless Relations for Turbulent Drag Reduction by Polymer Additives," Journal of Non-Newtonian Fluid Mechanics, 1998, 75(2-3), pp. 209-230.

Koeltzsch, K. et al., "Drag Reduction Using Surfactants in a Rotating Cylinder Geometry", Experiments in Fluids, 2003, 34, pp. 515-530.

Yang, S.-Q. et al., "Turbulent Drag Reduction with Polymer Additive in Rough Pipes", Journal of Fluid Mechanics, 2010, 642, pp. 279-294.

Li et al., "A direct measurement of wall shear stress in multiphase flow—Is it an important parameter in CO2 corrosion of carbon steel pipelines?", Corrosion Science, vol. 110, pp. 35-45, 2016.

* cited by examiner

CHARACTERIZATION OF FLUIDS WITH DRAG REDUCING ADDITIVES IN A COUETTE DEVICE

BACKGROUND

Field

The present application relates to laboratory analysis of fluids, particularly fluids with drag reducing additives added thereto.

Related Art

Drag reducers are chemical additives, which being added to a fluid, significantly reduce friction pressure losses on fluid transport in a turbulent regime through pipelines. Such chemical additives, usually polymers, may decrease pressure drop by up to 80 percent, and thus allows reducing the friction losses to the same extent.

The efficiency of drag reducers is usually tested in a flow loop. For a given drag reducer type and concentration a pressure drop along a laboratory pipe is measured at the Reynolds number that is maximally close to that expected in an industrial pipeline. A relative reduction in the pressure drop, in comparison to that in a flow free of drag reducers, is a measure of the additive efficiency.

Kalashnikov, V. N., "Dynamical Similarity and Dimensionless Relations for Turbulent Drag Reduction by Polymer Additives," *Journal of Non-Newtonian Fluid Mechanics*, Vol. 75, 1998, pp. 1209-1230, describes a Taylor-Couette device used for studies of turbulent drag reduction caused by polymer additives. The Taylor-Couette device includes a rotating outer cylinder and an immobile inner cylinder. An effect of a drag reducer was evaluated by the torque, applied to the inner cylinder. The greater reduction in torque resulting from the additive resulted in improved drag reducer performance. The drag reduction was investigated for a wide range of Reynolds numbers and the author suggests dimensionless criteria for drag reduction characterization.

Koeltzsch et al., "Drag Reduction Using Surfactants in a Rotating Cylinder Geometry," *Experiments in Fluids*, Vol. 24, 2003, pp. 515-530, studies turbulent drag reduction in a device of a similar design. Note that measurement of the torque applied to the inner cylinder has a limited accuracy due to unavoidable friction in bearings.

SUMMARY

The present application provides a method of characterizing fluid flow in a pipe where the fluid includes a drag reducing polymer of a particular type and particular concentration. A computational model is configured to model flow of a fluid in a pipe. The computational model utilizes an empirical parameter for a drag reducing polymer of the particular type and the particular concentration. The computational model can be used to derive information that characterizes the flow of the fluid in the pipe.

In one embodiment, the empirical parameter for the particular type and concentration of the drag reducing polymer can be derived by solving another computational model that is configured to model turbulent flow in a Couette device for a fluid that includes a drag reducing polymer of the particular type and concentration. The solution of the empirical parameter for the particular type and concentration of the drag reducing polymer can calculated from experimental data derived from operation of the Couette device with a fluid that includes a drag reducing polymer of the particular type and concentration.

In another embodiment, the computational model of the pipe flow includes a drag reduction parameter that is a function of the empirical parameter. The drag reduction parameter is a function of a dimensionless pipe radius $R^+$. For example, the computational model of the pipe flow can be configured to relate the drag reduction parameter to the empirical parameter by an equation of the form:

$$D_* = 1 + \alpha_* R^+$$

where
$D_*$ is the drag reduction parameter,
$\alpha_*$ is the empirical parameter, and
$R^+$ is the dimensionless pipe radius.

In yet another embodiment, the computational model of the pipe flow includes a friction factor that is a function of the drag reduction parameter, wherein the friction factor relates pressure loss due to friction along a given length of pipe to the mean flow velocity through the pipe. For example, the computational model of the pipe flow can be configured to relate the friction factor to the drag reduction parameter by an equation of the form:

$$\frac{1}{f^{0.5}} = 4\log_{10}(\mathrm{Re} f^{0.5}) + 8.2 D_*^2 - 8.6 - 12.2 \log_{10} D_*$$

where
f is the friction factor,
$D_*$ is the drag reduction parameter, and
Re is the Reynolds number of the flow in the pipe.

The computational model of the pipe flow can be further configured to relate the Reynolds number Re to a dimensionless pipe radius $R^+$. The information derived from the computational model of the pipe flow can include a solution for the friction factor f for given flow conditions and possibly a pressure drop over a given length of pipe based on the solution for the friction factor f.

The computational model of the pipe flow can be based upon a representation of the flow as two layers consisting of a viscous outer sublayer that surrounds a turbulent core.

The computational model for the turbulent Couette flow can be based upon a representation of the turbulent Couette flow as three layers consisting of viscous outer and inner sublayers with a turbulent core therebetween.

In one embodiment, the Couette device defines an annulus between first and second annular surfaces, and the computational model for the turbulent Couette flow includes a first drag reduction parameter associated with the first annular surface and a second drag reduction parameter associated with the second annular surface, wherein both the first and second drag reduction parameters are also functions of the empirical parameter specific to a drag reducing polymer of the particular type and the particular concentration. The first and second drag reduction parameters are also functions of a dimensionless torque G applied to the Couette device rotor.

The computational model for the turbulent Couette flow can also be based on an equation that defines a fluid velocity at a boundary of a viscous sublayer adjacent one of the first and second annular surfaces. Such equation can be derived by momentum conservation for a turbulent core.

DETAILED DESCRIPTION

Figure 1:
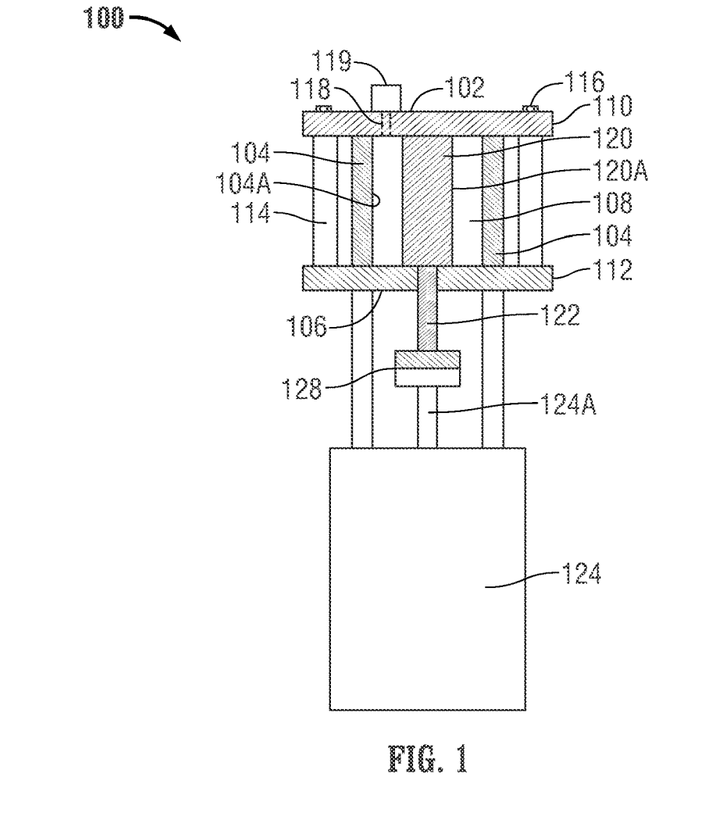
FIG. 1 is a schematic cross-sectional diagram of an exemplary cylindrical Couette device.

FIG. 1 shows an exemplary cylindrical Couette device 100, which includes a top wall 102, outer cylinder 104, inner cylinder 120, and bottom wall 106 that define the boundary of an annulus 108 disposed between the inner surface 104A of the outer cylinder 104 and the outer surface 120A of the inner cylinder 120. The Couette device 100 further has top and bottom retaining plates 110, 112 set apart by spacers 114 and mechanically secured, for example, by nuts and bolts 116. A fluid is loaded into the annulus 108 preferably through one or more fluid paths (e.g., one shown as port 119 and passageway 118).

The inner cylinder 120 is mounted on bearings and is coaxial with the outer cylinder 104. The outer cylinder 104 is fixed in position and thus remains stationary. The inner cylinder 120 rotates independently of the outer cylinder 104. A shaft 122 extends down from the bottom of the inner cylinder 120. A motor 124 has an output shaft 124A that is mechanically coupled to the shaft 122 by means of a coupling device 128, which can be a magnetic coupler, a rigid coupler, a flexible coupler, or other suitable coupling mechanism. In the preferred embodiment, the motor 124 can operate over a wide range of rotational speeds (e.g., 100-20,000 rpm) for rotating the inner cylinder 120 at different angular velocities.

Instrumentation can be added to the Couette device 100 as needed. For example, devices for heating and/or cooling the fluids within the annulus 108 of the Couette device 100 may be added. Such devices may be used in conjunction with loading fluid into the annulus 108 to achieve a predetermined pressure in the annulus 108. Pumps are used to transfer the fluids into the annulus 108. The pumps define and maintain the pressure of the system. One or more temperature sensors and one or more pressure sensors can be mounted adjacent the annulus 108 to measure fluid temperature and pressure therein. In one embodiment, the rotational speed of the inner cylinder 120 is measured through the use of a proximity sensor, which measures the rotational speed of the shaft 122 mechanically coupled to the inner cylinder 120.

Figure 2:
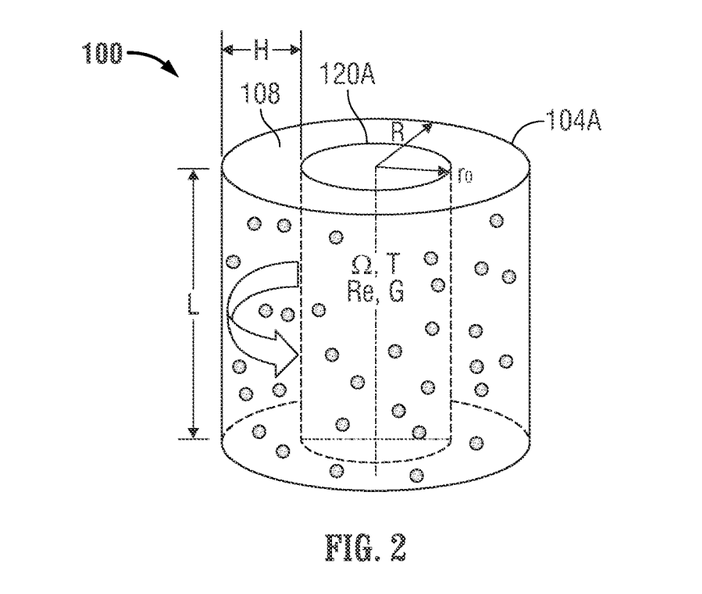
FIG. 2 is a schematic diagram of the annular surfaces of the cylindrical Couette device of FIG. 1.

A schematic diagram of the Couette device 100 is shown in FIG. 2, with the radius R denoting the radius of the inner wall surface 104A of the outer cylinder 104 and the radius $r_0$ denoting the radius of the outer surface 120A of the inner cylinder. The annulus or gap 108 between the inner and outer cylinders has a width H of $(R-r_0)$ and a height of L. A fluid mixture that employs a drag reducer of a specific type and concentration is loaded into the annulus 108 via port 119 and passageway 118. The motor 124 is operated at a sufficient speed to provide turbulent flow of the fluid in the annulus 108 such that the Reynolds number of the Couette flow $Re_c$ exceeds $1.3 \times 10^4$. The Couette flow circulates in the annulus 108 during such operations.

Figure 3:
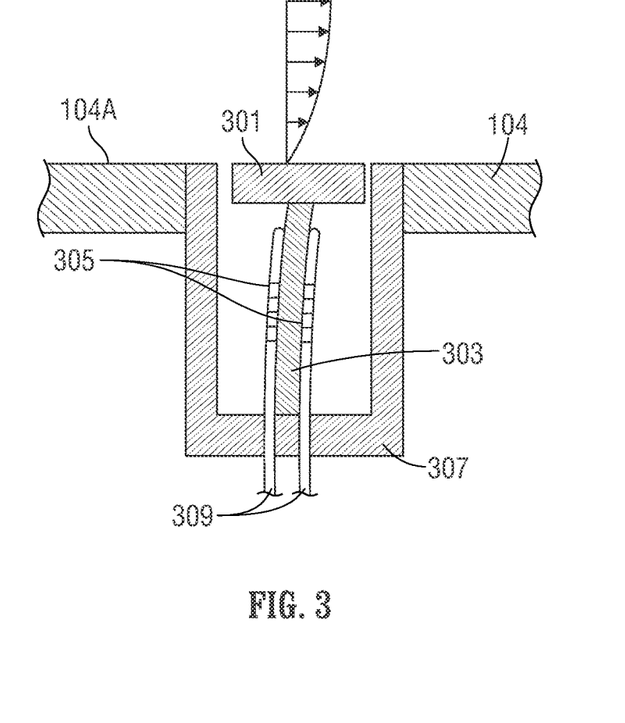
FIG. 3 is a schematic diagram of a sensing apparatus that employs the Lenterra technique to measure shear stress of the fluid at the surface of the wall of the outer cylinder of the cylindrical Couette device of FIG. 1.

The shear stress of the fluid at the inner surface 104A of the wall of the outer cylinder 104 is measured using the Lenterra technique that combines a floating element 301 and a mechanical cantilever beam 303 with a micro-optical strain gauge (fiber Bragg grating or FBG) 305 as shown in FIG. 3. The shear stress is applied to the floating element 301 attached to the cantilever beam 303. The floating element is installed flush with the inner wall surface 104A of the outer cylinder 104 in a sensor enclosure 307. Displacement of the floating element 301 leads to bending of cantilever beam 303. When the cantilever beam bends, the FBG is strained in a manner that shifts its optical spectrum. By interrogating the FBG with a light source via optical fibers 309, this strain (and therefore the shear stress) is measured by tracking the shift in the resonant wavelength. The shear stress is calculated as $\tau_w = k\Delta\lambda$, where k is the calibration coefficient and $\Delta\lambda$ is the shift in the resonant wavelengths. This technique provides more accurate shear stress measurements (as compared to the measurement of the torque applied to the Couette device spindle as is commonplace in many Couette devices). The shear stress measuring sensor devices of FIG. 3 are available from Lenterra, Inc. of Newark, N.J., USA.

A. Couette Device Computational Model

The Couette fluid flow in the annulus 108 of the Couette device 100 can be studied in terms of the dimensionless torque G and the Reynolds number $Re_c$ for such fluid flow. The dimensionless torque G is defined as a function of the torque T derived from shear stress $\tau_w$ measured at the inner wall surface 104A of the outer cylinder 104 of the Couette device 100 as follows:

$$G = \frac{T}{\rho v^2 L} \qquad (1)$$

where $T = \tau_w 2\pi R^2 L$, R is the radius of the inner wall of the outer cylinder of the Couette device, $\rho$ is the density of the fluid, $v$ is the kinematic viscosity of the fluid, and L is the height of the gap of the Couette device.

The Reynolds number $Re_c$ for Couette fluid flow in the annulus 108 of the Couette device 100 can be calculated as:

$$Re_c = \frac{\omega r_0 (R - r_0)}{v} \qquad (2)$$

where $r_0$ is the outer radius of the inner cylinder 120 of the Couette device 100, and
$\omega$ is the rotor angular velocity of the inner cylinder 120 of the Couette device 100.

Figure 4:
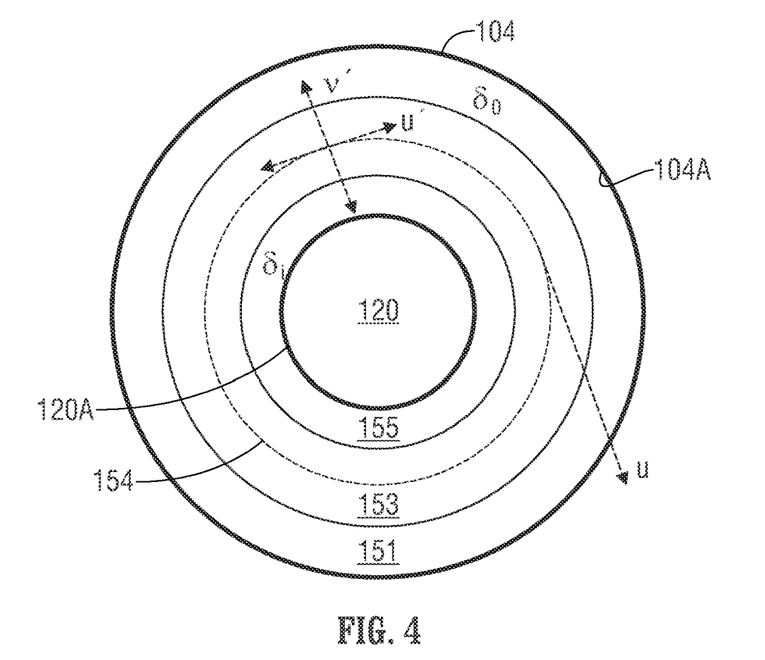
FIG. 4 is a schematic diagram of the layers of the flow field used in a computational model of turbulent Couette fluid flow in the cylindrical Couette device of FIG. 1.

To model the Couette flow in the Couette device 100, the flow field of turbulent Couette fluid flow in the Couette device 100 can be described by three layers including a relatively viscous outer sublayer 151 adjacent the inner surface 104A of the outer cylinder 104, a viscous inner sublayer 155 adjacent the outer surface 120A of the inner cylinder 120, and a turbulent layer or core 153 between the viscous inner and outer sublayers 151, 155 as shown in FIG. 4. The streamwise (tangential) velocity of the fluid flow in the Couette device 100 is shown as vector u in FIG. 4. Velocity fluctuations in the fluid flow can have a streamwise component u' and a radial component v' as shown.

The model assumes a linear velocity distribution across the viscous outer sublayer 151:

$$u^+ = y^+, \quad y^+ \leq \delta_0^+ \qquad (3)$$

where $u^+$ is the normalized fluid velocity given by $u^+ = u/u_{0*}$ where u is the streamwise velocity of the viscous outer sublayer 151 and $u_{0*}$ is the friction velocity of the viscous outer sublayer 151 given by $u_{0*}=(\tau_w/\tau)^{0.5}$, $y^+$ is given as $y^+=u_{0*}y/\nu$ where y is the distance from the inner wall 104A of the outer cylinder 104, and $\delta_0^+$ is the dimensionless thickness of the viscous outer sublayer 151, $\delta_0^+$ is set to a predetermined value such as 11.6.

The velocity distribution across the turbulent core 153 for the region confined by the boundary of the viscous outer sublayer 151 and the gap centerline 154 at $R_m=0.5(r_0+R)$ is described by the ordinary differential equation as:

$$\frac{d\frac{u}{r}}{dr} = -\frac{u_{0*}R}{\kappa(R-r)r^2} \quad (4)$$

where κ is the Von Karman constant, which can be set to a predetermined value such as 0.45; other suitable values of the Von Karman constant can be used; note that a decrease in the Von Karman constant can require a corresponding reduction in $\delta_0^+$, while an increase in the Von Karman constant can require a corresponding increase in $\delta_0^+$.

The initial condition for Eq. (4) is the normalized velocity at the viscous outer sublayer surface boundary $u^+(\delta_0^+)$ equal to a parameter λ (i.e., $u^+(\delta_0^+)=\lambda$). In one embodiment, the parameter λ is set to a predetermined value such as 11.6 assuming the dimensionless velocity distribution across the laminar sublayer in a Couette flow is identical to that in the pipe wall vicinity.

The analytical solution of Eq. (4) is given by:

$$\frac{u(r)}{u_{0*}} = \frac{1}{\kappa}\left(1+\frac{r}{R}\ln\left(\frac{R}{r}-1\right)\right)+\gamma\frac{r}{R} \quad (5)$$

where $$\gamma = \frac{\lambda - \frac{1}{\kappa}\left(1+(1-a)\ln\left(\frac{a}{1-a}\right)\right)}{1-a}; \quad (6)$$

where $a=\delta_0^+/R^+$ where $R^+$ is the dimensionless radius of the inner wall surface 104A of the outer cylinder 104 of the Couette device 100.

$R^+$ can be expressed through the dimensionless torque G as follows:

$$R^+ = \sqrt{\frac{G}{2\pi}} \quad (7)$$

The momentum conservation equation for the turbulent core 153 for the region confined by the gap centerline 154 at $R_m=0.5(r_0+R)$ and the outer surface of the viscous inner sublayer 155 can be given as:

$$\frac{d\frac{u}{r}}{dr} = -\frac{u_{0*}R}{\kappa(r-r_0)r^2} \quad (8)$$

The initial condition for Eq. (8) can derived from the normalized velocity at the gap centerline 154 at $R_m=0.5(r_0+R)$ according to Eq. (5) as follows:

$$\frac{u(R_m)}{u_{0*}} = \frac{1}{\kappa}\left(1+\frac{1+\eta}{2}\ln\left(\frac{1-\eta}{1+\eta}\right)\right)+\gamma\frac{1+\eta}{2} \quad (9)$$

where η is the ratio $r_0/R$.

Then, the analytical solution of Eq. (8) is given by:

$$\frac{u(r)}{u_{0*}} = \frac{u(R_m)}{u_{0*}}\frac{r}{R_m}+\frac{1}{\kappa}\frac{R}{r_0}\left(-1+\frac{r}{R_m}+\frac{r}{r_0}\ln\left(\frac{1-\frac{r_0}{R_m}}{1-\frac{r_0}{r}}\right)\right) \quad (10)$$

The circumferential velocity $U_i$ is the velocity of the rotating cylinder surface 120A of the inner cylinder 120 and calculated as:

$$U_i=\omega r_0. \quad (11a)$$

The circumferential velocity $U_i$ can also be calculated by:

$$U_i=u(r_0+\delta_i)+\lambda u_{i*} \quad (11b)$$

where $\delta_i$ is the thickness of the viscous inner sublayer 155 adjacent the outer surface 120A of the inner cylinder 120,
u is the streamwise velocity for the viscous inner sublayer 155,
λ is a parameter set to a predetermined value such as 11.6, and
$u_{i*}$ is the friction velocity of the viscous inner sublayer 155 at the outer surface 120A of the inner cylinder 120.

Eq. (11b) can be rewritten as follows:

$$\frac{U_i}{u_{0*}} = \frac{u(r_0+\delta_i)}{u_{0*}}+\frac{\lambda}{\eta} \quad (12)$$

The left-hand side of Eq. (12) can be expressed through the dimensionless torque G and the Reynolds number $Re_c$ to obtain:

$$\frac{(2\pi)^{0.5}}{1-\eta}\frac{Re_c}{G^{0.5}} = \frac{u(r_0+\delta_i)}{u_{0*}}+\frac{\lambda}{\eta} \quad (13)$$

For the right-hand side of Eq. (13), the velocity $u(r_0+\delta_i)$ can be equated to $u(r_0+\delta_0\eta)$ and then calculated by Eq. (10) to give:

$$\frac{u(r_0+\delta_i)}{u_{0*}} = \\ \frac{u(R_m)}{u_{0*}}\frac{2\eta}{1+\eta}(1+a)+\frac{1}{\kappa}\left(-\frac{1}{\eta}+\frac{2(1+a)}{1+\eta}+\frac{1+a}{\eta}\ln\frac{(1-\eta)}{(1+\eta)}\frac{(1+a)}{a}\right) \quad (14)$$

Eqs. (9), (13) and (14) represent a computation model for Couette flow without a drag reducer that can be solved to calculate the relationship of the dimensionless torque G as a function of the Reynolds number $Re_e$ for the Couette flow without a drag reducer.

B. Extension of Couette Device Computational Model to Account for Drag Reducer

The computational model for the Couette flow without a drag reducer as described above can be extended by considering two distinct drag reduction parameters: the drag reduction parameter $D_{0*}$ for the viscous outer sublayer 151, and the drag reduction parameter $D_{i*}$ for the viscous inner sublayer 155.

The drag reduction parameter $D_{0*}$ for the viscous outer sublayer 151 can be related to the parameter $\alpha_*$ that is a function of the drag reducer agent type and its concentration as follows:

$$D_{0*} = 1 + \alpha_* \frac{u_{0*} H}{2\nu} \tag{15a}$$

where
$u_{0*}$ is the friction velocity of the viscous outer sublayer 151 given by $u_{0*} = (\tau_w/\rho)^{0.5}$,
H is the gap width of the Couette device ($H = r_0 - R$), and
$\nu$ is the kinematic viscosity of the fluid.

Similarly, the drag reduction parameter $D_{i*}$ for the viscous inner sublayer 155 can be related to the parameter $\alpha_*$ that is a function of the drag reducer agent type and its concentration as follows:

$$D_{i*} = 1 + \alpha_* \frac{u_{i*} H}{2\nu} \tag{15b}$$

where
$u_{i*}$ is the friction velocity of the viscous inner sublayer 155,
H is the gap width of the Couette device ($H = r_0 - R$), and
$\nu$ is the kinematic viscosity of the fluid.

The Reynolds number of the Couette flow $Re_c$ is given by:

$$Re_c = \frac{U_i H}{\nu} \tag{16}$$

where
$U_i$ is the circumferential velocity of the inner cylinder 120,
H is the gap width of the Couette device ($H = r_0 - R$), and
$\nu$ is the kinematic viscosity of the fluid.

Eq. (16) can be used to rewrite Eq. (15a) as follows:

$$D_{0*} = 1 + \alpha_* \frac{u_{0*} Re_c}{2 U_i} \tag{17a}$$

Similarly, Eq. (16) can be used to rewrite Eq. (15b) as follows:

$$D_{i*} = 1 + \alpha_* \frac{u_{i*} Re_c}{2 U_i} \tag{17b}$$

As described in Eqs. (11) and (12) above, the ratio $$\frac{u_{0*} Re_c}{U_i}$$

of Eq. (17a) can be defined as:

$$\frac{u_{0*} Re_c}{U_i} = (1 - \eta) \sqrt{\frac{G}{2\pi}} \tag{18}$$

Eq. (18) can be used to rewrite Eq. (17a) as follows:

$$D_{0*} = 1 + \frac{\alpha_*}{2}(1 - \eta) \sqrt{\frac{G}{2\pi}} \tag{19}$$

Similarly, the ratio $$\frac{u_{i*} Re_c}{U_i}$$

of Eq. (17b) can be defined as:

$$\frac{u_{0*} Re_c}{U_i} = \frac{(1 - \eta)}{\eta} \sqrt{\frac{G}{2\pi}}$$

Eq. (20) can be used to rewrite Eq. (17b) as follows:

$$D_{i*} = 1 + \frac{\alpha_*}{2} \frac{(1 - \eta)}{\eta} \sqrt{\frac{G}{2\pi}} \tag{21}$$

By analogy with a pipe flow, the thickness $\delta_0^+$ of the viscous outer sublayer 151 is related to the drag reduction parameter $D_{0*}$ for the viscous outer sublayer 151 as follows:

$$\delta_0^+ = 11.6 D_{0*}^3 \tag{22}$$

Similarly, the thickness $\delta_i^+$ of the viscous inner sublayer 155 is related to the drag reduction parameter $D_{i*}$ for the viscous inner sublayer 155 as follows:

$$\delta_i^+ = 11.6 D_{i*}^3 \tag{23}$$

The corresponding dimensionless velocity $\lambda_0$ at the boundary of the viscous outer sublayer 151 can be given as:

$$\lambda_0 = \frac{\delta_0^+}{D_{0*}} = 11.6 D_{0*}^2 \tag{24}$$

The corresponding dimensionless velocity $\lambda_i$ at the boundary of the viscous inner sublayer 155 can be given as:

$$\lambda_i = \frac{\delta_i^+}{D_{i*}} = 11.6 D_{i*}^2 \tag{25}$$

The normalized velocity at the boundary of the inner viscous sublayer 155 can be derived on the basis of Eq. (10) above to provide:

$$\frac{u(r_0 + \delta_i)}{u_{0*}} = \tag{26}$$

-continued $$\frac{u(R_m)}{u_{0*}} \frac{2\eta}{1+\eta}(1+m) + \frac{1}{\kappa}\left(-\frac{1}{\eta} + \frac{2(1+m)}{1+\eta} + \frac{1+m}{\eta}\ln\frac{(1-\eta)}{(1+\eta)}\frac{(1+m)}{m}\right)$$

where $m = \delta_i^+/r_0^+$, $r_0^+ = R^+$ where $R^+$ is calculated by Eq. (7).

The normalized velocity at the gap centerline 154 of Eq. (26)

$$\frac{u(R_m)}{u_{0*}}$$

is given by Eqs. (9) and (6) as repeated below:

$$\frac{u(R_m)}{u_{0*}} = \frac{1}{\kappa}\left(1 + \frac{1+\eta}{2}\ln\left(\frac{1-\eta}{1+\eta}\right)\right) + \gamma\frac{1+\eta}{2} \quad (27)$$

$$\text{where } \gamma = \frac{\lambda - \frac{1}{\kappa}\left(1 + (1-a)\ln\left(\frac{a}{1-a}\right)\right)}{1-a}; \quad (28)$$

The parameter $\alpha = \delta_0^+/R^+$ and $\lambda = \lambda_0$ needed for Eq. (28) can be determined for the outer cylinder by Eqs. (19), (22) and (24).

The set of Eqs. (13), (19), (21)-(27) define a computational model for the Couette flow that accounts for the drag reducing effects of the drag reducer. The computational model is dependent on the dimensions of the Couette device 100, including the radius R of the inner wall surface 104A of the outer cylinder 104, the ratio η (which is the ratio $r_0/R$), and the height L of the gap of the Couette device 100. The parameter $\alpha_*$ is the major model variable that is a function of the drag reducer agent type and its concentration.

The fluid density ρ and the kinematic viscosity ν of the fluid are measured separately.

The shear stress $\tau_w$ and corresponding rotor angular velocity ω of the Couette device 100 are measured during operation of the Couette device 100 for a given drag reducer agent type and its concentration.

The value of the parameter $\alpha_*$ for the given drag reducer agent type and concentration of the test can be provided by statistical analysis of experimental data. Specifically, experiments can be carried out with the Couette device for a fluid solution that employs a given drag reducing additive at a particular concentration where the shear stress $\tau_w$ is measured for a set of different rotor angular velocities ω. The set of measurements of shear stress and corresponding rotor angular velocity as well as the measured fluid density ρ and the kinematic viscosity ν are input to the computation model based on Eqs. (13), (19), (21)-(27) to solve for the parameter $\alpha_*$ for the given drag reducer agent type and its concentration.

An important aspect of drag reduction phenomenon, not accounted for by the drag reduction model presented, is the maximum drag reduction asymptote. This asymptote provides the minimum Fanning friction factors obtainable. The minimum friction factor obtainable in a pipe flow is described by the empirical equation of Virk (1971):

$$\frac{1}{f^{0.5}} = 19\log_{10}(\text{Re}f^{0.5}) - 32.4 \quad (29)$$

Equation (29) is applicable to a Couette flow, where the Reynolds number ($\text{Re}_c$) number calculated by Eq. 16 is used instead of Re and the Fanning friction factor is calculated for the inner cylinder wall.

The Fanning friction factor f for the inner cylinder of the Couette device is calculated from the shear-stress equation applied to the inner cylinder using Eqs. (1) and (7) and takes the following form:

$$\frac{1}{f^{0.5}} = \frac{\text{Re}_c}{\left(\frac{1}{\eta} - 1\right)\sqrt{\frac{G}{\pi}}} \quad (30)$$

The preferable radius ratio η for the Couette device is below 0.7. It follows from the dependences $1/f^{0.5}$ versus Re $f^{0.5}$ calculated for different coefficients $\alpha_{*_0}$ at different η. The smaller the Couette device radius ratio, the stronger the curves $1/f^{0.5}$ vs. Re $f^{0.5}$ are shifted downward from the drag reduction asymptote. The lower these curves are located, the wider range of the coefficient $\alpha_{*_0}$ can be identified during testing different drag reducing chemicals.

C. Application of Couette Device Computational Model Solution of Part B to Pipe Flow Modeling and Analysis For a fluid solution employing a drag reducing agent that flows in a pipe, the flow field for turbulent flow in the pipe can be described by two layers, which include a relatively viscous outer sublayer adjacent the pipe wall and a turbulent inner core surrounded by the viscous outer sublayer.

Applying the approach proposed by Yang and Dou in "Turbulent Drag Reduction with Polymer Additive in Rough Pipes," *Journal of Fluid Mechanics*, Vol. 642, 2010, pp. 279-294, the velocity distribution across the viscous sublayer at the pipe wall may be obtained in the following form:

$$u^+ = 2.5 \ln y^+ + 11.6 D_*^2 - 7.5 \ln D_* - 6.1 \quad (31)$$

where $u^+$ is the normalized fluid velocity given by $u^+ = u/u_{0*}$, $y^+$ given as $y^+ = u_* y/\nu$ where y is the distance from the pipe wall, $u_*$ is the friction velocity given by $u_* = (\tau_w/\rho)^{0.5}$, $\tau_w$ is the shear stress at the pipe wall, ρ is the density of the fluid of the solution, and ν is the kinematic viscosity of the fluid of the solution; and $D_*$ is a drag reduction parameter.

The drag reduction parameter $D_*$ of Eq. (31) is related to the parameter $\alpha_*$ that is a function of the drag reducer agent type and its concentration as described above in the computational model of Part B as follows:

$$D_* = 1 + \alpha_* R^+ \quad (32)$$

where $R^+$ is the dimensionless pipe radius.

The normalized mean flow velocity $$\frac{U}{u_*}$$

can be calculated by averaging the velocity $u^+$ of Eq. (31) over the pipe cross-section as:

$$\frac{U}{u_*} = \frac{1}{\pi(R^+)^2}\int_0^R u^+ 2\pi R^+(R^+ - y^+)dy^+ \quad (33)$$

Furthermore, the normalized mean flow velocity $$\frac{U}{u_*}$$

is related to the friction factor f by:

$$\frac{U}{u_*} = \sqrt{\frac{2}{f}} \quad (34)$$

where U is the mean flow velocity through the pipe, and $u_*$ is the friction velocity given by $u_* = (\tau_w/\rho)^{0.5}$.

The friction factor f relates pressure loss due to friction along a given length of the pipe to the mean flow velocity through the pipe.

The integration of Eq. (33) can be performed analytically to obtain an equation for the friction factor f as follows:

$$\frac{1}{f^{0.5}} = 4\log_{10}(\text{Re}f^{0.5}) + 8.2D_*^2 - 8.6 - 12.2\log_{10}D_* \quad (35)$$

As given by Eq. (32), the drag reduction parameter $D_*$ of Eq. (35) is a function of the dimensionless pipe radius $R^+$, which can be related to the Reynolds number Re of the flow in the pipe and the friction factor f by:

$$R^+ = 0.5\text{Re}\sqrt{f/2} \quad (36)$$

The Reynolds number Re of Eq. (36) is Oven by:

$$\text{Re} = \frac{UD}{v} \quad (37)$$

The dimensionless pipe radius is calculated as:

$$R^+ = 0.5\frac{u_*D}{v} = 0.5\frac{(\tau_w/\rho)^{0.5}D}{v} \quad (38)$$

where
$u_*$ is the friction velocity given by $u_* = (\tau_w/\rho)^{0.5}$,
D is the diameter of the pipe, and
v is the kinematic viscosity of the fluid.

Equation (35) is the major model equation for calculating the friction factor $f_*$ The friction factor can be used for engineering calculations of the pipe flow, such as the predicted pressure drop in the pipe (over the length L) for the flow employing a particular drag reducer agent type and concentration, which is given as $$\Delta p = 2\rho f \frac{U^2}{D} L.$$

The fluid density $\rho$ and the kinematic viscosity v of the fluid are measured separately.

The Reynolds number Re of the fluid flow is determined by the mean flow velocity, the pipe diameter and the fluid kinematic viscosity, which are known.

The parameter $\alpha_*$ that is a function of the drag reducer agent type and its concentration is given by the solution of the computational model in Part B for the given drag reducer agent type and its concentration.

These operations can be carried out for a number of different concentrations of a particular drag reducer agent type or over different drag reducer agents to characterize the expected pipe flow for these different scenarios. It can also be carried out for a number of fluid flows with different Reynolds number Re to characterize the expected pipe flow for these different scenarios.

The computational models of Parts A, B, and C of the present application can be realized by one or more computer programs (instructions and data) that are stored in the persistent memory (such as hard disk drive or solid state drive) of a suitable data processing system and executed on the data processing system. The data processing system can be a realized by a computer (such as a personal computer or workstation) or a network of computers.

Advantageously, the computational model of Part C characterizes the pipe flow of a dilute drag reducer polymer solution through the use of an empirical parameter that is a function of the drag reducer polymer type and concentration. This empirical parameter can be derived from the solution of a computation model for turbulent Couette flow of such drag reducer polymer solutions based upon experiments that generate and measure properties of the turbulent Couette flow for such dilute drag reducer polymer solutions as described in Part B above.

Furthermore, the computational models of the present application employ a two layer representation of the boundary layer interfaces for both the turbulent Couette flow and the pipe flow in order to simplify the equations for such fluid flow. Specifically, the turbulent Couette flow is represented by three layers including viscous inner and outer sublayers with a turbulent core therebetween, and the pipe flow is represented by a viscous outer sublayer that surrounds a turbulent core. The computation model of the turbulent Couette flow also provides for computation of the dimensionless torque applied to the Couette device as a function of the rotation speed for a given drag reducer polymer type and its concentration.

There have been described and illustrated herein embodiments of computational models that characterize the pipe flow of a dilute drag reducer polymer solution with the use of an empirical parameter that is a function of the drag reducer polymer type and its concentration. This empirical parameter can be derived from the solution of a computation model for turbulent Couette flow of such drag reducer polymer solutions based upon experiments that generate and measure properties of the turbulent Couette flow for such dilute drag reducer polymer solutions. While particular embodiments have been described, it is not intended that the embodiments be limited thereto. It will therefore be appreciated by those skilled in the art that yet other modifications could be made to the provided embodiments without deviating from its scope as claimed.

What is claimed is:

1. A method of characterizing fluid flow in a pipe where the fluid includes a drag reducing polymer of a particular type and particular concentration, the method comprising:
   i) providing a Couette device that includes an annulus disposed between an outer annular surface and an inner annular surface and a sensor disposed adjacent the outer annular surface, wherein the sensor is configured to measure shear stress of fluid at the outer annular surface;
   ii) providing a first computational model associated with the Couette device of i) to model turbulent Couette flow of a fluid based upon a flow representation consisting of an inner sublayer, an outer sublayer, and a turbulent core between the inner sublayer and the outer sublayer, wherein the first computational model includes an empirical parameter for the particular type and the particular concentration of the drag reducing polymer that is based on the shear stress of the fluid at the outer annular surface measured by the sensor, and wherein the first computational model further includes a first drag reduction parameter associated with the outer sublayer and a second drag reduction parameter associated with the inner sublayer, wherein both the first and second drag reduction parameters are based on the empirical parameter;

iii) loading a fluid into the annulus of the Couette device of i), the fluid including the particular type and the particular concentration of the drag reducing polymer, and operating the Couette device of i) to induce turbulent flow of the fluid in the annulus of the Couette device and to obtain related experimental data including shear stress of the fluid at the outer annular surface measured by the sensor;

iv) processing the first computational model of ii) in conjunction with the experimental data obtained in iii) on a data processor to solve for the empirical parameter of the first computational model;

v) providing a second computational model that is configured to model flow of fluid in a pipe, wherein the second computational model includes a drag reduction parameter that is a function of the empirical parameter as solved for in iv), and wherein the second computational model further includes a friction factor that is a function of the drag reduction parameter, wherein the friction factor relates pressure loss due to friction along a given length of pipe to the mean flow velocity through the pipe; and vi) processing the second computational model on a data processor to derive information that characterizes the flow of fluid in the pipe.

2. A method according to claim 1, wherein the drag reduction parameter is also a function of a dimensionless pipe radius.

3. A method according to claim 2, wherein the second computational model is configured to relate the drag reduction parameter to the empirical parameter by an equation of the form:

$$D_* = 1 + \alpha_* R^+$$

where
  $D_*$ is the drag reduction parameter,
  $\alpha_*$ is the empirical parameter, and
  $R^+$ is the dimensionless pipe radius.

4. A method according to claim 1, wherein the second computational model is configured to relate the friction factor to the drag reduction parameter by an equation of the form:

$$\frac{1}{f^{0.5}} = 4\log_{10}(\text{Re}f^{0.5}) + 8.2D_*^2 - 8.6 - 12.2\log_{10}D_*$$

where
  f is the friction factor,
  $D_*$ is the drag reduction parameter, and
  Re is the Reynolds number of the flow in the pipe.

5. A method according to claim 4, wherein the second computational model is further configured to relate the Reynolds number Re to a dimensionless pipe radius $R^+$.

6. A method according to claim 4, wherein the information derived in iv) includes a solution for the friction factor f for given flow conditions.

7. A method according to claim 6, wherein the information derived in iv) includes a pressure drop over a given length of pipe based on the solution for the friction factor f.

8. A method according to claim 1, wherein the second computational model is based upon a representation of the flow as two layers consisting of a viscous outer sublayer that surrounds a turbulent core.

9. A method according to claim 1, wherein both the first and second drag reduction parameters are also based on a dimensionless torque G derived from the shear stress of the fluid at the outer annular surface measured by the sensor.

10. A method according to claim 9, wherein:
  the outer and inner annular surfaces of the Couette device of i) are concentric with respect to one another about a common center, wherein the outer annular surface is offset from the center by a first radius R and the inner annular surface is offset from the center by a second radius $r_0$, wherein R is greater than $r_0$; and
  the first computational model is configured to relate the first and second drag reduction parameters to the empirical parameter by equations of the following form:

$$D_{o^*} = 1 + \frac{\alpha_*}{2}(1-\eta)\sqrt{\frac{G}{2\pi}}$$

$$D_{i^*} = 1 + \frac{\alpha_*}{2}\frac{(1-\eta)}{\eta}\sqrt{\frac{G}{2\pi}}$$

where
  $D_{o^*}$ is the drag reduction parameter associated with the outer sublayer,
  $D_{i^*}$ is the drag reduction parameter associated with the inner sublayer,
  $\alpha_*$ is the empirical parameter,
  $\eta$ is the ratio $r_0/R$, and
  G is the dimensionless torque derived from the shear stress of the fluid at the outer annular surface measured by the sensor.

11. A method according to claim 1, wherein the first computational model includes an equation that defines a fluid velocity at a boundary of a viscous sublayer adjacent one of the outer and inner annular surfaces.

12. A method according to claim 11, wherein the equation is derived by momentum conservation for a portion of a turbulent core adjacent the viscous sublayer.

13. A method according to claim 1, wherein:
  the sensor comprises a floating element, a mechanical cantilever beam and a fiber Bragg grating strain gauge.

14. A method according to claim 9, wherein:
  the dimensionless torque G is determined based upon the following relation:

$$G = \frac{T}{\rho v^2 L}$$

where
- T is a torque derived from a shear stress $\tau_w$ as $T=\tau_w 2\pi R^2 L$, where the shear stress $\tau_w$ is the shear stress of the fluid at the outer annular surface measured by the sensor, R is the radius of the outer annular surface,
- $\rho$ is the density of the fluid,
- $\nu$ is the kinematic viscosity of the fluid, and
- L is the height of the gap of the Couette device.

15. A method according to claim 1, wherein:
the method is repeated for a number of different concentrations of a particular drag reducing polymer or over different drag reducing polymers to characterize the expected pipe flow for these different scenarios.

16. A method according to claim 1, wherein:
the method is repeated for a number of different flow conditions to characterize the expected pipe flow for these different scenarios.

17. A method of characterizing fluid flow in a pipe where the fluid includes a drag reducing polymer of a particular type and particular concentration, the method comprising:
   i) providing a Couette device that includes an annulus disposed between an outer annular surface and an inner annular surface;
   ii) providing a first computational model associated with the Couette device of i) to model turbulent Couette flow of a fluid, wherein the first computational model includes an empirical parameter for the particular type and the particular concentration of the drag reducing polymer;
   iii) loading a fluid into the annulus of the Couette device of i), the fluid including the particular type and the particular concentration of the drag reducing polymer, and operating the Couette device of i) to induce turbulent flow of the fluid in the annulus of the Couette device and to obtain related experimental data;
   iv) processing the first computational model of ii) in conjunction with the experimental data obtained in iii) on a data processor to solve for the empirical parameter;
   v) providing a second computational model that is configured to model flow of fluid in a pipe, wherein the second computational model is configured to utilize the empirical parameter as solved for in iv); and
   vi) processing the second computational model on a data processor to derive information that characterizes the flow of fluid in the pipe;
wherein the first computational model includes a first drag reduction parameter associated with the outer annular surface of the Couette device of i) and a second drag reduction parameter associated with the inner annular surface Couette device of i), wherein both the first and second drag reduction parameters are based on the empirical parameter and a dimensionless torque G applied to the Couette device;
wherein the outer and inner annular surfaces of the Couette device of i) are concentric with respect to one another about a common center, wherein the outer annular surface is offset from the center by a first radius R and the inner annular surface is offset from the center by a second radius $r_0$, wherein R is greater than $r_0$; and
wherein the first computational model is configured to relate the first and second drag reduction parameters to the empirical parameter by equations of the following form:

$$D_{o^*} = 1 + \frac{\alpha_*}{2}(1-\eta)\sqrt{\frac{G}{2\pi}}$$

$$D_{i^*} = 1 + \frac{\alpha_*}{2}\frac{(1-\eta)}{\eta}\sqrt{\frac{G}{2\pi}}$$

where
- $D_{o^*}$ is the drag reduction parameter associated with the outer annular surface,
- $D_{i^*}$ is the drag reduction parameter associated with the inner annular surface,
- $\alpha_*$ is the empirical parameter,
- $\eta$ is the ratio $r_0/R$, and
- G is the dimensionless torque applied to the Couette device.

18. A method according to claim 17, wherein:
the Couette device of i) includes a sensor disposed adjacent the outer annular surface, wherein the sensor is configured to measure shear stress of fluid at the outer annular surface;
the empirical parameter of the first computation model is based on the shear stress of the fluid at the outer annular surface measured by the sensor; and
the experimental data obtained in iii) and processed in iv) includes the shear stress of the fluid at the outer annular surface measured by the sensor.

19. A method according to claim 18, wherein:
the dimensionless torque G is determined based upon the following relation $$G = \frac{T}{\rho \nu^2 L},$$

where T is a torque derived from a shear stress $\tau_w$ as $T=\tau_w 2\pi R^2 L$, where the shear stress $\tau_w$ is the shear stress of the fluid at the outer annular surface measured by the sensor, R is the radius of the outer annular surface, L is the height of the gap of the Couette device, $\rho$ is the density of the fluid, and $\nu$ is the kinematic viscosity of the fluid.

20. A method according to claim 1, wherein:
the sensor is located in a sensor enclosure disposed adjacent the outer annular surface.

* * * * *